Oct. 24, 1961  R. V. WHITE  3,005,508
PARKING ATTACHMENT FOR AUTOMOBILES
Filed April 29, 1959  2 Sheets-Sheet 1
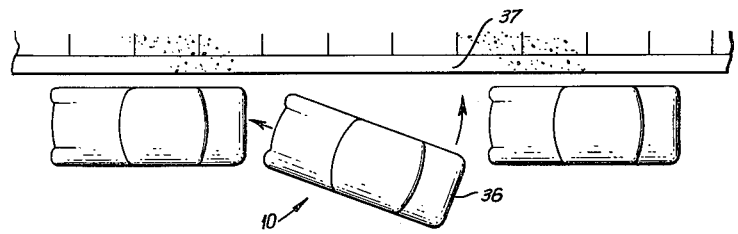
FIG. 1
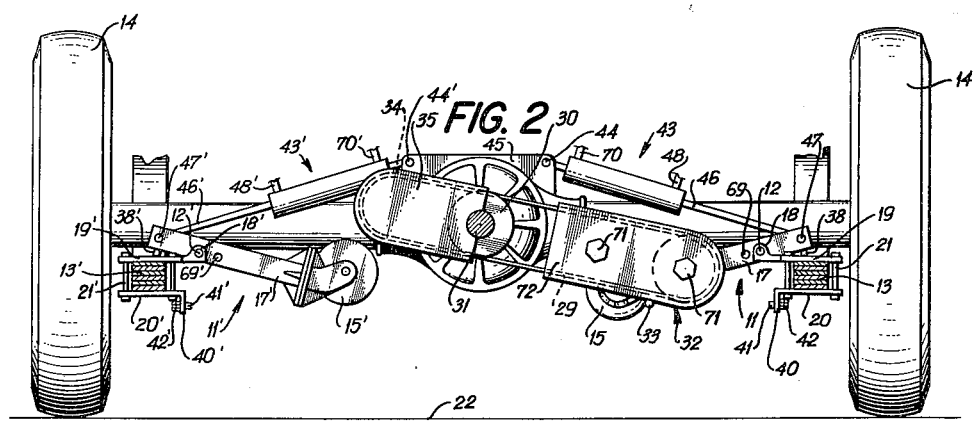
FIG. 2
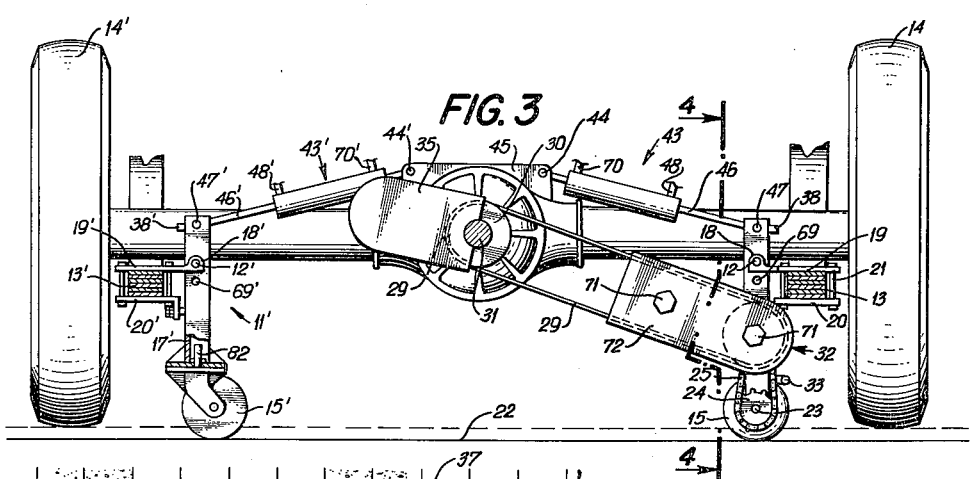
FIG. 3
FIG. 7
INVENTOR.
REX V. WHITE Oct. 24, 1961   R. V. WHITE   3,005,508
PARKING ATTACHMENT FOR AUTOMOBILES
Filed April 29, 1959   2 Sheets-Sheet 2
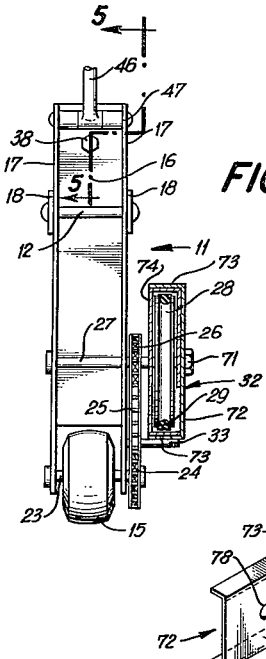
FIG. 4
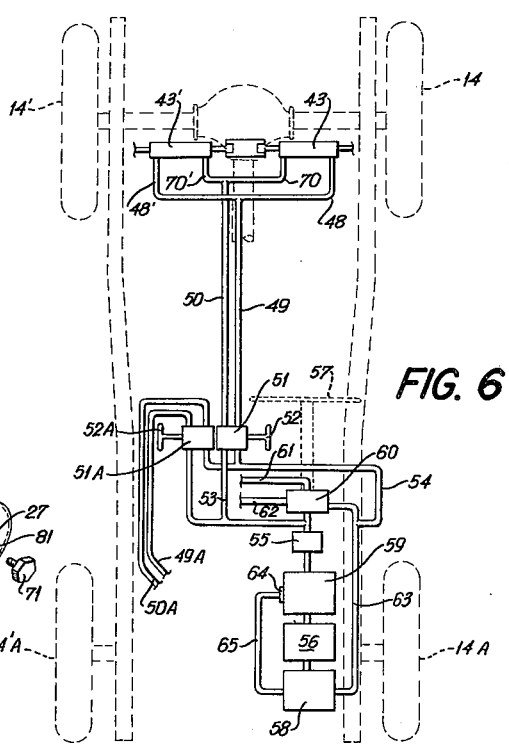
FIG. 6
FIG. 4A
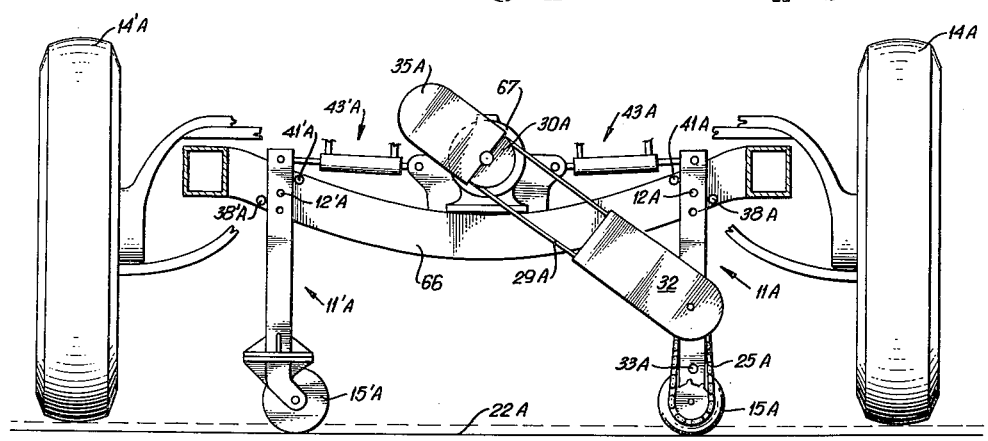
FIG. 8
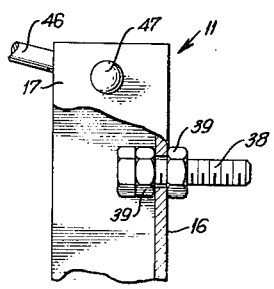
FIG. 5
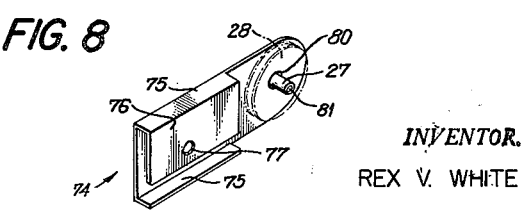
FIG. 4B
INVENTOR.
REX V. WHITE

United States Patent Office 3,005,508
Patented Oct. 24, 1961

3,005,508
PARKING ATTACHMENT FOR AUTOMOBILES
Rex V. White, 2048 S. La Cienego Blvd., Apt. 1,
Los Angeles, Calif.
Filed Apr. 29, 1959, Ser. No. 809,809
3 Claims. (Cl. 180—1)

The present invention consists of apparatus which may be called a parking attachment for automobiles (which shall be broadly considered as meaning any powered and wheeled vehicle) and consisting of a pair of auxiliary wheel supporting structures, each provided at the bottom with an auxiliary wheel, and each mounted adjacent (usually just inwardly of) left and right ones of a pair of main vehicle wheels in a manner such as to allow oppositely directed pivotal movement of each of said auxiliary wheel supporting structures around parallel longitudinal axes substantially perpendicular to the axis of rotation of the pair of main vehicle wheels, between a retracted position with each of said auxiliary supporting structures and auxiliary wheels carried thereby being inwardly directed and lying immediately under the vehicle body and out of contact with an underlying road surface, and a vertically downwardly extended position with each of said auxiliary wheel supporting structures extending downwardly to a point effectively positioning the corresponding auxiliary wheel so as to be transversely directed with respect to the main vehicle wheels and at a level below them whereby the vehicle body will be lifted upwardly from an underlying road surface and will be supported by said auxiliary wheel supporting structures and the auxiliary wheels carried thereby.

It should be noted that this vehicle lifting operation is accomplished by means of first and second oppositely directed actuator means connected to said first and second auxiliary wheel supporting structures and arranged to be controllably simultaneously oppositely actuatable between said retracted and fully extended downwardly directed positions, and vice versa, by a driver of the vehicle from a location conveniently accessible to said driver.

It should further be noted that in one preferred form, the above-mentioned oppositely directed first and second actuator means each comprises a double action hydraulic cylinder provided with a source of hydraulic fluid under pressure, suitable conduit means interconnecting same, and controllable valve means therein positioned for manual actuation by a driver of a vehicle.

It should also be noted that the parking attachment apparatus of the present invention includes power takeoff means effectively connecting the drive shaft of the vehicle and one or the other of said auxiliary wheels carried by the corresponding auxiliary wheel supporting structure for controllably transversely driving same in a manner corresponding to the direction of rotation of the vehicle drive shaft, when said auxiliary wheel is in contact with an underlying road surface and in the downwardly fully extended position, whereby to cause the portion of said vehicle adjacent said auxiliary wheels to be driven in either of two transverse directions with respect to the longitudinal direction of the vehicle and with respect to the normal longitudinal direction in which the vehicle travels on the main vehicle wheels, thus providing an arrangement for facilitating the easy parking of a vehicle in a relatively restricted parking area adjacent a curbing along the edge of a street, or the like, and vice versa.

It is an object of the present invention to provide apparatus which may be said to comprise a parking attachment for vehicles of the general type described hereinbefore and which will make it possible for a driver equipped with the parking attachment of the present invention to park in relatively short parking spaces along the curb at the edge of a street, or the like, in which it would normally be virtually impossible to park the automobile in the prior art conventional manner. Furthermore, the parking of the vehicle through the use of the parking attachment of the present invention does not require the extensive operation of the steering wheel and the extensive back-and-forth movement of the automobile required to accomplish parking in a limited space by prior art conventional methods—in other words, parking through the use of the parking attachment of the present invention is extremely simple and can be accomplished with a minimum of effort.

It is a further object to provide apparatus of the character set forth in the preceding object, which may be effectively connected to a conventional pre-existing automobile and which, if desired, may use a conventional power steering apparatus, or the like, carried by the automobile, which may be controllably switched into cooperative relationship with respect to the actuators of the apparatus of the present invention so as to swing the auxiliary wheels and supporting structures into either downwardly extended position or retracted position, when desired, thus making it unnecessary to provide an additional hydraulic pressurizing system. However, if desired, the apparatus of the present invention may be provided with its own individual hydraulic pressurizing system. This is particularly true in those automobiles which do not have a power steering system prior to the subsequent installation of the parking attachment apparatus of the present invention.

It is a further object to provide apparatus of the character set forth in any of the preceding objects, wherein the pair of auxiliary wheel supporting structures and auxiliary wheels carried thereby may be positioned adjacent the rear main wheels of an automobile, the front main wheels of the automobile or both, if desired. In the latter case, individual controls may be provided, if desired, so that the front and rear portions of the parking attachment adjacent the front and rear main wheels of the automobile may be independently operated, if desired, or may be simultaneously operated.

It is a further object to provide apparatus of the character set forth in any of the preceding objects which is of extremely simple, cheap, foolproof construction such as to be conducive to widespread use thereof.

Further objects will be apparent to persons skilled in the art after a careful study hereof.

For the purpose of clarifying the nature of the present invention, several exemplary embodiments are illustrated in the hereinbelow-described figures of the accompanying two sheets of drawings and are described in detail hereinafter.

FIG. 1 is a reduced-size diagrammatic top plan view illustrating the parking operation of a vehicle equipped with the apparatus of the present invention.

FIG. 2 is a larger-scale fragmentary, partly broken-away, partly elevational and partly sectional view illustrating a portion of an automobile as seen from a position just forward of the rear two main vehicle wheels looking toward the rear end of the automobile.

FIG. 3 is a view similar to FIG. 2, but shows the parking attachment apparatus of the present invention in operative position.

FIG. 4 is a larger-scale fragmentary view taken in the direction of the arrows 4—4 of FIG. 3, but with the vehicle axis, springs, and wheel removed for purposes of drawing simplification and clarity.

FIG. 4A is a fragmentary perspective view of just the front portion of the drive belt cover or shroud.

FIG. 4B is a fragmentary perspective view of just the rear portion of the drive belt cover or shroud.

FIG. 5 is an enlarged fragmentary sectional view taken in the direction of the arrows 5—5 of FIG. 4

FIG. 6 is a diagrammatic schematic fragmentary view illustrating the connection of the two actuators shown in FIGS. 2 and 3 with respect to a source of hydraulic fluid under pressure through suitable conduit means and controllable valve means.

FIG. 7 is a view similar to FIG. 1, but shows one automobile equipped with both a front and rear parking attachment apparatus and also shows a second automobile equipped with just a front parking attachment apparatus.

FIG. 8 is a view generally similar to FIG. 3 but illustrates a modified attachment of the apparatus to the automobile and a modified drive for one of the auxiliary wheels.

In the specific embodiment of the invention illustrated in FIG. 1–6, the present invention takes one specific form and is adapted to be connected with respect to an automobile body, such as is indicated generally at 10 in FIG. 1, by having a first auxiliary wheel supporting structure, indicated generally at 11, pivotally attached by suitable pivot pin means 12 with respect to the conventional spring structure 13 of the automobile adjacent a first one 14 of a rear pair of transversely spaced main automobile wheels, with said first wheel supporting structure 11 being provided at the bottom with transversely directed auxiliary wheel means 15. In the specific example illustrated, the auxiliary wheel supporting structure 11 takes the form of a longitudinal metallic channel member of substantially U-shaped cross-sectional configuration having a main member 16 and two side members 17, with the two side members 17 being apertured and transversely carrying the pivot pin 12 therethrough and extending outwardly into fastened rotative relationship with respect to the spaced ears 18 of a fastening plate 19 which lies immediately above the conventional automobile springs 13 and which is spaced above a lower fastening plate 20 which lies immediately below the conventional automobile springs 13, with the upper and lower fastening plates 19 and 20 being firmly and rigidly fastened together against the corresponding top and bottom surfaces of the conventional automobile springs 13 by means of suitable fastening bolts 21. It will be understood that this arrangement firmly fastens the entire first auxiliary wheel supporting structure 11 with respect to the conventional automobile springs 13 for transverse pivoting movement around the pivot pin 12 between the retracted position shown in FIG. 2 and the downwardly extended position shown in FIG. 3 with the auxiliary wheel 15 in supporting contact with an underlying road surface indicated at 22.

It should be noted that the pivot pin 12 may be adjustably positioned, such as by mounting it in aligned holes 69 in the side members 17 of the auxiliary wheel supporting structure 11, if desired, in order to modify the operating characteristics of the device so as to make it capable of operation with automobiles and/or automobile wheels of different sizes and configurations.

In the specific example illustrated, the first auxiliary wheel supporting structure 11 has the main member 16 cut away at the bottom thereof so as to allow the auxiliary wheel 15 to be rotatively mounted by suitable axle means 23 below the lower ends of the side members 17. It should be noted that the axle 23 is extended at one end and fixedly carries a sprocket 24 adapted to engage a continuous sprocket chain 25 which is also engaged with a sprocket 26 fixed to a shaft 27 rotatively in aligned apertures in the spaced side members 17 of the auxiliary wheel supporting structure 11, with said shaft 27 having an extended portion fixedly carrying a pulley sheave 28 which is adapted to be driven by a coupling belt 29 effectively connecting said pulley sheave 28 and another pulley sheave 30 connected to the main drive shaft 31 of the automobile, when the first wheel supporting structure 11 is in the downwardly extended position shown in FIG. 3. It should be clearly understood that when the first auxiliary wheel supporting structure 11 is in the retracted position shown in FIG. 2, the left end of the belt 29, as viewed in FIG. 2, is pushed out of engagement with the driving pulley sheave 30 by reason of the cover or shroud 32 which lies immediately around the other pulley sheave 28 and the belt 29 and which is preferably made of two portions (to facilitate mounting the belt 29) joined together by fastening screws 71 and rotatively mounted with respect to the shaft 27 and, therefore, adapted to be swung inwardly from the position shown in FIG. 3 into the position shown in FIG. 2 by means of a shroud-lifting pin 33 which moves through an arc when the first wheel supporting structure 11 is moved from the extended position shown in FIG. 3 into the retracted position shown in FIG. 2, such as to abut the lower side of the shroud or cover 32 whereby to positively position the relatively stiff belt 29 upwardly and toward the left as viewed in FIG. 2 into the dotted line position indicated at 34 within a second shroud or cover 35. It will be understood that this will cause the left end of the belt 29 to be out of driven engagement with respect to the driving pulley 30 so that the drive shaft 31 of the automobile will not cause the wheel 15 to rotate when the apparatus is in the retracted position shown in FIG. 2. However, it will also be understood that when the first auxiliary supporting structure 11 is pivoted into the downwardly extended road-engaging position shown in FIG. 3, the left end of the belt 29 is drawn into tight frictional engagement with the driving pulley sheave 30 so that rotation of the drive shaft 31 of the automobile in either direction will cause correspondingly directed transverse rotation of the auxiliary wheel 15, whereby to cause the rear end 36 of the automobile, indicated generally at 10 in FIG. 1, to swing inwardly toward a curbing 37 in the manner indicated by the arrow, or vice versa, depending upon which direction the driver of the automobile causes the drive shaft 31 to rotate.

In the specific example illustrated, the shroud 32 is of split construction to facilitate mounting the belt 29 around the sheave 28, and includes a front portion 72 provided with a continuous rearwardly directed edge flange 73 extending along the top, bottom, and curved right end thereof, and additionally includes a rear portion 74 provided with a forwardly directed edge flange 75 extending along the top and bottom thereof, but not along the curved right end thereof. Furthermore, the top flange 75 has a downwardly turned portion 76 provided with a screw receiving aperture 77 alignable with a similar screw receiving aperture 78 carried in a similar location by the front portion 72 whereby a left headed screw 71 may be threadedly mounted so as to effectively but controllably disengageably fasten the front and rear portions 72 and 74 together. The front and rear portions 72 and 74 are provided with alignable apertures 79 and 80 adapted to rotatively pass therethrough the shaft 27, which has a threaded recess 81 at its outer end adapted to controllably removably threadedly receive the right headed screw 71 whereby to rotatively fasten the corresponding part of the front portion 72 with respect to the shaft 27.

In the specific example illustrated, the main member 16 of the first auxiliary supporting structure 11 is provided with controllably adjustable stop means taking the form of a threaded bolt member 38 having multiple nuts 39 so arranged that the threaded bolt member 38 may be adjusted into any selected position with respect to the member 16 so as to abut the member 19 in the manner shown in FIG. 2 whereby to limit the pivotal travel of the auxiliary wheel supporting structure 11 when moving toward the retracted position. Also, in the specific example illustrated a downwardly directed portion 40 of the fastening plate 20 may be similarly provided with a transversely directed threaded bolt portion 41 and multiple nuts 42 allowing for controlled adjustment of the position of the threaded bolt member 41 so as to limit the downward travel of the first auxiliary supporting structure 11 into the downwardly extended position shown in FIG. 3.

In the specific embodiment illustrated, movement of said first auxiliary supporting wheel means is provided by actuator means indicated generally at 43 and comprising a double action hydraulic cylinder having one end connected, as indicated at 44, to a fixed central member 45 of the automobile and having at the other end the controllably reciprocable connecting rod 46 extending outwardly therefrom and being pivotally connected, as indicated at 47, to the side members 17 of the first auxiliary supporting member 11 at the top thereof whereby operation of the hydraulic cylinder or actuator 43 so as to cause retraction of the piston therein (not shown since such is well known and conventional in the art) and the connecting rod 46 from the position shown in FIG. 2 into the position shown in FIG. 3, will cause the entire first auxiliary supporting strutcure 11 to pivot around the pivot pin 12 from the normal retracted position shown in FIG. 2 into the downwardly extended road engaging position shown in FIG. 3, and vice versa, upon oppositely directed operation of the hydraulic cylinder or actuator 43, when desired. The means for controllably operating the hydraulic cylinder or actuator 43 in either direction will be described in detail hereinafter. However, two conduits 70 and 48 connected to opposite ends thereof are shown partially broken away in FIG. 2 and will be referred to in detail hereinafter in connection with the description of FIG. 6.

The form of the present invention illustrated in FIGS. 1–6 also includes a second auxiliary wheel supporting structure indicated generally at 11' similar to the first auxiliary wheel supporting structure 11 described in detail hereinabove. Since said second auxiliary wheel supporting structure 11' is substantially identical to the first auxiliary wheel supporting structure 11, except for the elimination of certain parts, it will not be described in extensive detail. Corresponding parts of this second auxiliary wheel supporting structure and also the second actuator 43', and the interconnections thereof, are indicated by primed reference numerals similar to those employed in connection with the corresponding specifically described elements of the first auxiliary wheel supporting structure 11 and the first actuator 43. However, the second wheel supporting structure 11' does not include a shaft corresponding to the shaft 27 carried by the first auxiliary wheel supporting structure, nor does it include a sprocket wheel corresponding to the sprocket wheel 26 carried by the first auxiliary wheel supporting structure 11 nor does it include a pulley sheave corresponding to the pulley sheave 28 carried by the first auxiliary wheel supporting structure 11, nor does it include a sprocket wheel similar to the sprocket wheel 24 carried by the first auxiliary wheel supporting structure 11, nor does it include a shroud similar to the shroud 32 carried by the first auxiliary wheel supporting structure 11. In other words, there is no direct connection between the main drive pulley sheave 30 and the second auxiliary wheel 15' carried at the bottom of the second auxiliary wheel supporting structure 11'; said second auxiliary wheel 15' being a non-driven follower or idler wheel only, since it is not necessary that both of the auxiliary wheels 15 and 15' be power driven. The wheel 15' is castered by the pin 82.

Incidentally, it should be noted that the relative positioning of the first and second wheel supporting structures 11 and 11', the wheels carried thereby, and the coupling of the main drive shaft 31 with respect thereto, may be reversed from the positions shown in FIGS. 2 and 3, if desired.

FIG. 6 illustrates one form of hydraulic circuitry and source of hydraulic fluid under pressure which may be employed to operate the first and second actuators 43 and 43'. In this arrangement the conduits 48 and 48' are connected to a conduit 49, while the conduits 70 and 70' are connected to a conduit 50, with both of the conduits 49 and 50 passing through a valve indicated diagrammatically at 51, which is of the type having four apertures and which may be controllably and interchangeably connected and which is conventionally known in the prior art as a "four-way valve." This valve is controllably operable by means of a manual operating lever 52 whereby to effectively connect the conduit 50 to a high pressure conduit 53 or to a low pressure conduit 54 depending upon the position of the lever 52. Correspondingly, and at the same time, the other conduit 49 will be connected to the low pressure conduit 54 or the high pressure conduit 53; the arrangement being such that when the lever 52 is in one position the first and second auxiliary wheel supporting structures 11 and 11' are forcibly retracted into the positions shown in FIG. 2 while, when the lever 52 is moved to another position, the first and second auxiliary wheel supporting structures 11 and 11' are forcibly moved into the downwardly extended road engaging positions shown in FIG. 3. In the specific example illustrated, the high pressure conduit 53 is connected so as to have pressure-controlling means 55 positioned between the high pressure conduit 53 and a hydraulic pressurizing pump 56, which is adapted to be suitably driven, such as by the main engine of the automobile (not shown) or it may be independently driven by electric motor means, if desired. In the specific example illustrated, the pressure-controlling means 55 is part of a conventional power steering system and is adapted to be controllably and variably operated corresponding to the degree of rotation of the automobile steering wheel indicated in broken lines at 57. In other words, in order to increase the pressure of the hydraulic liquid in the conduit 53 above a normal minimum value, it is necessary to rotate the steering wheel 57 to some degree. The power steering system includes the pump 56 pumping hydraulic fluid out of a container 58 through a container 59, through the steering wheel-operated, variable pressure-controlling means 55, then through a four-way valve 60, also controlled by rotation of the steering wheel 57, whereby either high or low pressure may be supplied to the conduits 61 and 62, or vice versa; said conduits 61 and 62 being adapted to go to the front steering wheel linkage actuator means (not shown) for providing effective power steering of the front wheels 14A and 14'A of the automobile. This feature is not shown since such is conventional and well known in the art. The power steering system also includes a low pressure return conduit 63 from the valve 60 back to the pump container 58. The container 59 may be provided with a pressure relief valve 64 and a return bypass line 65 connected to the pump container 58. It should be clearly noted that the source of hydraulic pressure comprising one type of power steering apparatus, illustrated in FIG. 6, may be modified substantially, or an entire independent source of hydraulic fluid under pressure including pumping means, reservoir means, and the like, may be employed for operating the actuators 43 and 43'.

FIG. 6 also shows a portion of the control apparatus which would be necessary in order to operate another pair of actuators 43A and 43'A positioned adjacent the front wheels 14A and 14'A of the automobile, as illustrated in detail in FIG. 8. Therefore, the fragmentary portions of this front control apparatus are indicated by similar reference numerals, followed by the letter "A," however.

The front version of the invention illustrated in FIG. 8 is similar to the rear version of the invention illustrated in FIGS. 2 and 3 and, therefore, similar parts will be indicated by similar reference numerals, followed by the letter "A," however. In this modification, the first and second wheel supporting structures 11A and 11'A are directly pivoted by pivot pin means 12A and 12'A to a frame member 66 rather than to fastening plates such as those shown at 19, 20, 19', and 20' in FIGS. 2 and 3. In this modification, each of the controllably adjustable stop means corresponding to that shown at 38 and 38' in the first form of the invention, is indicated at 38A and 38'A and comprises a projection, such as a bolt or pin, carried by the frame member 66 for abutment by the outer side of the corresponding auxiliary wheel-supporting structure 11A or 11'A at a point below the pivotal connection thereof 12A or 12'A to the frame member 66 whereby to limit the inward pivotal travel of the auxiliary wheel-supporting structure when moving toward the retracted position. Also, in this modification, generally similar projections 41A and 41'A are carried by the frame member 66 adjacent the inner sides of the two auxiliary wheel-supporting structures 11A and 11'A above the pivotal connection points 12A and 12'A whereby to limit the downward or outward travel of each of the auxiliary supporting structures into the fully downwardly extended positions shown in FIG. 8. These stop members 41A and 41'A correspond to those designated at 41 and 41' in the first form of the invention. Also, in this modification, the main drive pulley sheave 30A is not driven by the automobile drive shaft as that shown at 31 in FIGS. 2 and 3, but is driven by an independently and controllably and reversibly energizable electric motor means 67, which is adapted to be provided with a remote operating button or the like positioned within the automobile at a conveniently accessible location for operation by the driver thereof (the remote operation of the electric motor 67 not being shown, since such is conventional and well known in the art).

It will be understood that the front wheel arrangement illustrated in FIG. 8 may be moved between retracted and extended positions by operation of the lever 52A shown in FIG. 6, and that transverse driving movement of the driving auxiliary wheel 15A may be caused by controlled and reversible energization of the electric motor 67 whereby the front end, as indicated at 68 in FIG. 7, of an automobile 10, may be caused to move transversely with respect to a curbing 37 either toward the curbing or away from the curbing in the manner clearly shown as being accomplished by the right automobile shown in FIG. 7, or in an automobile equipped with both the front parking attachment portion shown in FIG. 8 and the rear parking attachment portion shown in FIGS. 2 and 3, the automobile 10 may be caused to move directly transversely at both front and rear ends 68 and 36 in the manner of the intermediate automobile shown in FIG. 7.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A parking attachment for powered vehicles, comprising: first and second auxiliary wheel-supporting structures, each being provided at the bottom thereof with a corresponding auxiliary transversely directed wheel means and each being pivotally attached above the bottom thereof with respect to a corresponding portion of a powered vehicle body adjacent a corresponding one of a pair of transversely spaced vehicle main wheels for pivotal movement around a fore-and-aft longitudinal axis perpendicular to the axis of rotation of said pair of vehicle main wheels between a retracted position with each of said auxiliary wheel-supporting structures being inwardly directed and lying immediately under the vehicle body and out of contact with an underlying road surface, and vertically downwardly extended position with each of said auxiliary wheel-supporting structures extending downwardly to a point effectively positioning each of said auxiliary transversely directed wheel means at a level below the vehicle main wheels whereby a portion of the vehicle body will be lifted upwardly from an underlying road surface and will be supported by said auxiliary wheel-supporting structures and the auxiliary wheel means carried thereby; each of said auxiliary wheel-supporting structures being provided at the top thereof with oppositely directed actuator means controllably simultaneously oppositely actuatable from a location conveniently accessible to a driver of the vehicle for opposite movement of both of said auxiliary wheel-supporting structures between retracted and fully extended downwardly directed positions and vice versa; and power take-off means controllably effectively connecting a mechanically rotated drive shaft of the vehicle and said first auxiliary wheel means for controllably transversely driving same when it is in contact with an underlying road surface in the downwardly fully extended position in a direction corresponding to the direction of rotation of the drive shaft, said power take-off means extending transversely outwardly and angularly downwardly from its point of attachment to the mechanically rotated drive shaft of the vehicle adjacent a longitudinal center line of the vehicle to a point substantially directly below the pivotal mounting of said first auxiliary wheel-supporting structure and being pivotally connected to said first auxiliary wheel-supporting structure whereby said outwardly downwardly angularly inclined power take-off means, said vertically upwardly directed first auxiliary wheel-supporting structure when in the downward position, and the actuator means connected to the top of said wheel-supporting structure above the pivotal mounting of said wheel supporting structure effectively define a substantially polygonal configuration lying in a transversely directed plane with respect to the longitudinal fore-and-aft axis of the vehicle and extending between the centrally positioned mechanically rotated drive shaft of the vehicle and the transversely offset first auxiliary wheel-supporting structure in a manner such that movement of said first wheel-supporting structure into said retracted position will effectively shorten the distance between the pivotal connection of said power take-off means with respect to said first auxiliary wheel-supporting structure and the mechanically rotated drive shaft of the vehicle and will effectively disengage said first auxiliary wheel means from said vehicle drive shaft, said power take-off means being provided with slidably movable cover means and said first auxiliary wheel-supporting structure being provided with cover-lifting projecting pin means positioned below the pivotal connection of said power take-off means to said first auxiliary wheel-supporting structure, with said power take-off means being in the path of inward and upward arcuate travel of said cover-lifting pin means during movement of said first auxiliary wheel supporting structure into said retracted position for effectively lifting said cover means during said retracting movement and for effectively disengaging said power take-off means from said vehicle drive shaft by reason of the shortened distance between the pivotal connection of said power take-off means and said first auxiliary supporting structure and the vehicle drive shaft.

2. A parking attachment for powered vehicles, comprising: first and second auxiliary wheel-supporting structures, each being provided at the bottom thereof with a corresponding auxiliary transversely directed wheel means and each being pivotally attached above the bottom thereof with respect to a corresponding portion of a powered vehicle body adjacent a corresponding one of a pair of transversely spaced vehicle main wheels for pivotal movement around a fore-and-aft longitudinal axis perpendicular to the axis of rotation of said pair of vehicle main wheels between a retracted position with each of said auxiliary wheel-supporting structures being inwardly directed and lying immediately under the vehicle body and out of contact with an underlying road surface, and vertically downwardly extended position with each of said auxiliary wheel-supporting structures extending downwardly to a point effectively positioning each of said auxiliary transversely directed wheel means at a level below the vehicle main wheels whereby a portion of the vehicle body will be lifted upwardly from an underlying road surface and will be supported by said auxiliary wheel-supporting structures and the auxiliary wheel means carried thereby; each of said auxiliary wheel-supporting structures being provided at the top thereof with oppositely directed actuator means controllably simultaneously oppositely actuatable from a location conveniently accessible to a driver of the vehicle for opposite movement of both of said auxiliary wheel-supporting structures between retracted and fully extended downwardly directed positions and vice versa; and power take-off means controllably effectively connecting a mechanically rotated drive shaft of the vehicle and said first auxiliary wheel means for controllably transversely driving same when it is in contact with an underlying road surface in the downwardly fully extended position in a direction corresponding to the direction of rotation of the drive shaft, said power take-off means extending transversely outwardly and angularly downwardly from its point of attachment to the mechanically rotated drive shaft of the vehicle adjacent a longitudinal center line of the vehicle to a point substantially directly below the pivotal mounting of said first auxliary wheel-supporting structure and being pivotally connected to said first auxiliary wheel-supporting structure whereby said outwardly downwardly angularly inclined power take-off means, said vertically upwardly directed first auxiliary wheel-supporting structure when in the downward position, and the actuator means connected to the top of said wheel-supporting structure above the pivotal mounting of said wheel supporting structure effectively define a substantially polygonal configuration lying in a transversely directed plane with respect to the longitudinal fore-and-aft axis of the vehicle and extending between the centrally positioned mechanically rotated drive shaft of the vehicle and the transversely offset first auxiliary wheel-supporting structure in a manner such that movement of said first wheel-supporting structure into said retracted position will effectively shorten the distance between the pivotal connection of said power take-off means with respect to said first auxiliary wheel-supporting structure and the mechanically rotated drive shaft of the vehicle and will effectively disengage said first auxiliary wheel means from said vehicle drive shaft, said power take-off means being provided with slidably movable cover means and said first auxiliary wheel-supporting structure being provided with cover-lifting projecting pin means positioned below the pivotal connection of said power take-off means to said first auxiliary wheel-supporting structure, with said power take-off means being in the path of inward and upward arcuate travel of said cover-lifting pin means during movement of said first auxiliary wheel-supporting structure into said retracted position for effectively lifting said cover means during said retracting movement and for effectively disengaging said power take-off means from said vehicle drive shaft by reason of the shortened distance between the pivotal connection of said power take-off means and said first auxiliary supporting structure and the vehicle drive shaft; each of said oppositely directed actuator means comprising a transversely outwardly directed double-action, hydraulic cylinder adapted to be connected to a source of hydraulic fluid under pressure, conduit means for inter-connecting same, and controllable valve means therein positioned for manual actuation by a driver of the vehicle, the source of hydraulic fluid under pressure comprising a conventional pre-existing power steering apparatus of the pressurized hydraulic type carried by the vehicle.

3. A parking attachment for powered vehicles, comprising: first and second auxiliary wheel-supporting structures, each being provided at the bottom thereof with a corresponding auxiliary transversely directed wheel means and each being pivotally attached above the bottom thereof with respect to a corresponding portion of a powered vehicle body adjacent a corresponding one of a pair of transversely spaced vehicle main wheels for pivotal movement around a fore-and-aft longitudinal axis perpendicular to the axis of rotation of said pair of vehicle main wheels between a retracted position with each of said auxiliary wheel-supporting structures being inwardly directed and lying immediately under the vehicle body and out of contact with an underlying road surface, and vertically downwardly extended position with each of said auxiliary wheel-supporting structures extending downwardly to a point effectively positioning each of said auxiliary transversely directed wheel means at a level below the vehicle main wheels whereby a portion of the vehicle body will be lifted upwardly from an underlying road surface and will be supported by said auxiliary wheel-supporting structures and the auxiliary wheel means carried thereby; each of said auxiliary wheel-supporting structures being provided at the top thereof with oppositely directed actuator means controllably simultaneously oppositely actuatable from a location conveniently accessible to a driver of the vehicle for opposite movement of both of said auxiliary wheel-supporting structures between retracted and fully extended downwardly directed positions and vice versa; and power take-off means controllably effectively connecting a mechanically rotated drive shaft of the vehicle and said first auxiliary wheel means for controllably transversely driving same when it is in contact with an underlying road surface in the downwardly fully extended position in a direction corresponding to the direction of rotation of the drive shaft, said power take-off means extending transversely outwardly and angularly downwardly from its point of attachment to the mechanically rotated drive shaft of the vehicle adjacent a longitudinal center line of the vehicle to a point substantially directly below the pivotal mounting of said first auxiliary wheel-supporting structure and being pivotally connected to said first auxiliary wheel-supporting structure whereby said outwardly downwardly angularly inclined power take-off means, said vertically upwardly directed first auxiliary wheel-supporting structure when in the downward position, and the actuator means connected to the top of said wheel-supporting structure above the pivotal mounting of said wheel supporting structure effectively define a substantially polygonal configuration lying in a transversely directed plane with respect to the longitudinal fore-and-aft axis of the vehicle and extending between the centrally positioned mechanically rotated drive shaft of the vehicle and the transversely offset first auxiliary wheel-supporting structure in a manner such that movement of said first wheel-supporting structure into said retracted position will effectively shorten the distance between the pivotal connection of said power take-off means with respect to said first auxiliary wheel-supporting structure and the mechanically rotated drive shaft of the vehicle and will effectively disengage said first auxiliary wheel means from said vehicle drive shaft, said power take-off means being provided with slidably movable cover means and said first auxiliary wheel-supporting structure being provided with cover-lifting projecting pin means positioned below the pivotal connection of said power take-off means to said first auxiliary wheel-supporting structure, with said power take-off means being in the path of inward and upward arcuate travel of said cover-lifting pin means during movement of said first auxiliary wheel-supporting structure into said retracted position for effectively lifting said cover means during said retracting movement and for effectively disengaging said power take-off means from said vehicle drive shaft by reason of the shortened distance between the pivotal connection of said power take-off means and said first auxiliary supporting structure and the vehicle drive shaft; and controllably adjustable stop means limiting the inward and upward travel and the downward and outward travel of said auxiliary wheel supporting structures between said retracted and extended positions.

References Cited in the file of this patent

UNITED STATES PATENTS

| | | |
|---|---|---|
| 1,277,288 | Brasen | Aug. 27, 1918 |
| 1,480,850 | Allen et al. | Jan. 15, 1924 |
| 1,758,964 | Myers | May 20, 1930 |
| 2,674,092 | Gardiner | Apr. 6, 1954 |
| 2,746,554 | Matthews | May 22, 1956 |